United States Patent [19]

Verstegen

[11] 3,752,931

[45] Aug. 14, 1973

[54] TIME DIVISION MULTIPLEX EXCHANGES

[75] Inventor: Willi Verstegen, Meudon La Foret, France

[73] Assignee: International Standard Electric Corporation, New York, N.Y.

[22] Filed: Jan. 19, 1972

[21] Appl. No.: 218,992

[30] Foreign Application Priority Data

Feb. 22, 1971 Germany.................. P 21 08 407.1

[52] U.S. Cl.......................... 179/15 AQ, 179/18 AG
[51] Int. Cl............................................... H04j 3/00
[58] Field of Search.................. 179/15 AQ, 18 GF, 179/18 AG, 15 AT

[56] References Cited

UNITED STATES PATENTS 3,263,030 7/1966 Stiefel........................... 179/15 AQ

*Primary Examiner*—Kathleen H. Claffy
*Assistant Examiner*—David L. Stewart
*Attorney*—C. Cornell Remsen, Jr. et al.

[57] ABSTRACT

A TDM system is disclosed for use in multiplex exchanges in which trunk groups are divided into partial groups via switching devices which connect them to crosspoint groups. The switching devices are operated at the system clock rate, thereby eliminating the need for an address memory. The switching-devices, by dividing the trunk groups into partial groups connected to various crosspoint groups enable a larger percentage of traffic to be switched within the crosspoint groups and thus reduce the need for links between crosspoint groups. Each crosspoint group is wired with the same number of partial groups, so that in case of total failure of a crosspoint group, traffic in all directions is still possible.

5 Claims, 6 Drawing Figures

Patented Aug. 14, 1973 3,752,931

3 Sheets-Sheet 3

TIME DIVISION MULTIPLEX EXCHANGES

BACKGROUND OF THE INVENTION

1. Field of the Invention

The present application relates to a system for use in time-division multiplex exchanges in which the trunk groups of the individual directions are connected to crosspoint groups and the channels of each group are switched by the time-division multiplex technique, and in which several crosspoint groups are interconnected via links.

2. Description of the Prior Art

In space-division multiplex switching systems, it is customary to construct the switching networks as far as possible in modular manner. The crosspoint units necessary therefor are known as "crosspoint groups."

It is also common practice that trunk groups coming from other exchanges are connected via connecting devices with the exchange consisting of crosspoint groups so that, as far as possible, each crosspoint group is wired with lines of all occurring directions.

The thus obtained formation of partial groups in the incoming and outgoing trunk groups and the resulting low occupancy of the groups may be cancelled again by a suitable link system, i.e., a certain grouping of the crosspoint groups. Then, via these links, that part of the traffic which can no longer be handled in its own crosspoint group due to external blocking is passed from said crosspoint group to another one and switched there.

In time-division multiplex switching, particularly in PCM switching, efforts are being made to build the switching network in modular manner using time-division multiplex crosspoint groups. The number of crosspoint groups is raised with the increase in time-division multiplex transmission systems which carry the traffic from and to other exchanges of the network.

Each PCM transmission system contains a plurality of channels, which, in a PCM exchange, cannot be readily distributed among various time-division multiplex crosspoint groups. Instead, after a synchronizing operation between the clock rate of the PCM transmission system and that of the PCM exchange, each input of a time-division multiplex crosspoint group is wired, in an input circuit, with at least one complete PCM transmission system and, consequently, with all channels of this system.

If the time-division multiplex switching network of a PCM exchange is wired with many PCM transmission systems which, in turn, lead in many different directions, and if several crosspoint groups are required, additional connecting stages must be used either before or behind the crosspoint groups for handling the traffic between the crosspoint groups in order to enable the channels of the PCM transmission systems to have direct access to different crosspoint groups or in order to compensate for the traffic between the crosspoint groups.

To operate crosspoints by the time-division multiplex technique, use must be made of address memories, in which one address is required for each time slot, i.e., for each possible connection.

When the exchange is extended, the subsequent insertion of connecting stages in an existing switching network necessitates, aside from the additional investment in circuitry, extensive modifications and more complicated path-finding operations due to the greater number of connecting stages.

SUMMARY OF THE INVENTION

The invention has for its object to provide a system of the above referred to kind in which the expenditure can be considerably reduced. The invention is characterized in that, before the crosspoint groups, switching devices are provided by which the trunk groups are divided into partial groups which are connected to the various crosspoint groups. This result has the advantage that a large portion of the traffic is always switched within the crosspoint group; therefore, a smaller number of links is required. With the reduction of the number of links, the number of outputs of the crosspoint groups decreases, too.

A further aspect of the invention is characterized in that each crosspoint group is wired with the same number of partial groups as there are directions. If, in such a system, a crosspoint group totally fails traffic between all directions continues to be possible; major losses occur only during the busy hours, while in times of light traffic the operation is not affected at all.

Another aspect of the invention is characterized in that the switching devices for the formation of the partial groups are operated by the channel clock rate. Therefore, no address memory, which is otherwise required in PCM space connecting stages, is necessary, either.

BRIEF DESCRIPTIONS OF THE DRAWINGS

The invention will now be explained in more detail with reference to the embodiment illustrated in the accompanying drawings, in which.

DESCRIPTION OF PREFERRED EMBODIMENTS

Figure 1:
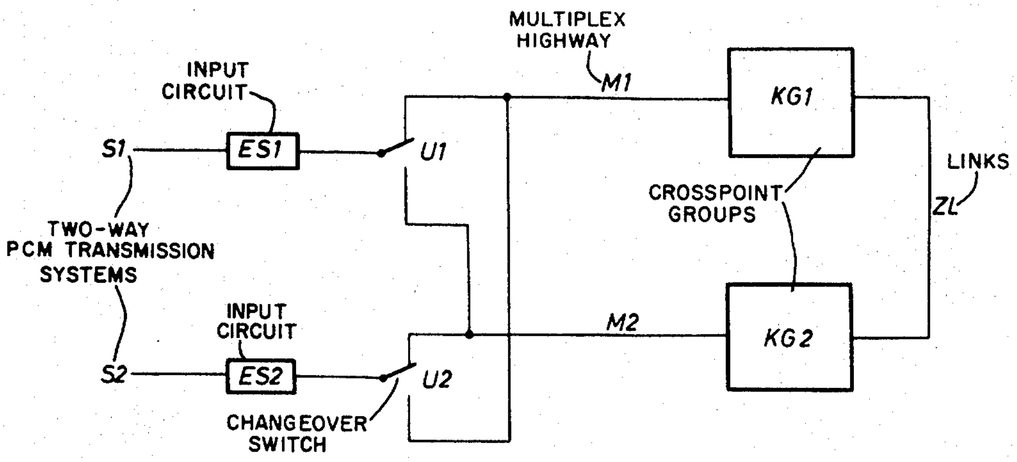
FIG. 1 is a block diagram of the system according to the invention.

The principle of the circuitry for the formation of two partial groups is shown in FIG. 1. The two-way PCM transmission systems S1 and S2, which are synchronized via the input circuits ES1 and ES2 with the clock rate of the PCM exchange, can reach both crosspoint groups KG1 and KG2 via a switching network, which, in the example with only two partial groups, can be reduced to the changeover switches U1 and U2, and the multiplex highways M1 and M2 within the exchange.

The changeover switches U1 and U2 are actuated directly or indirectly by the channel clock rate of the PCM exchange; this means that no additional address memory is required for thier actuation. In designing the input circuits ES1 and ES2, the changeover switches U1 and U2 can be merged with said input circuits.

In order to cancel the formation of partial groups, links *ZL* are necessary between the crosspoint groups KG1 and KG2. The number of these links may be considerably smaller than in the event of the inputs of the crosspoint groups being connected directly to the PCM transmission system.

Through-switching in the crosspoint groups KG1, KG2 is effected in known manner and, therefore, will not be described here.

Figure 2:
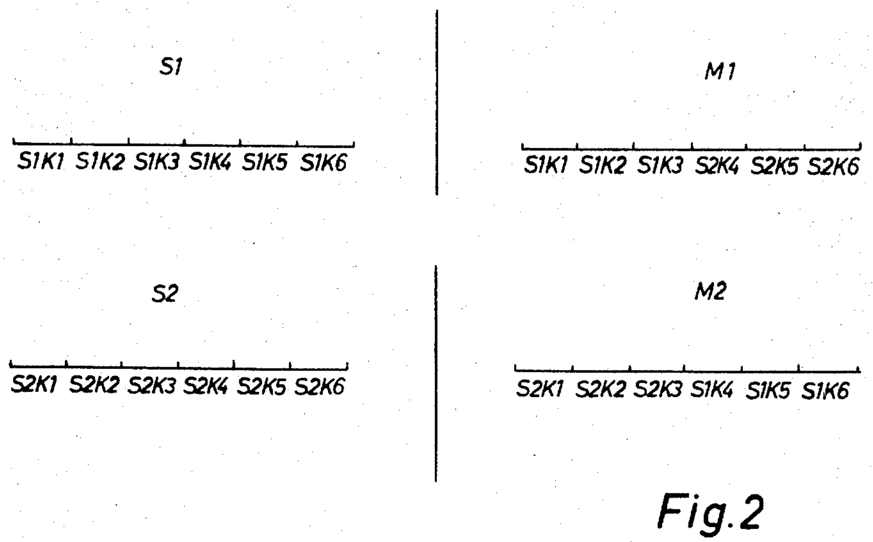
FIG. 2 shows the principle of the formation of partial groups.

The principle of the formation of partial groups is explained in FIG. 2. It is assumed that the two PCM transmission systems S1 and S2 have six channels K1 to K6 per pulse frame. The designation of the channels in FIG. 2 is composed of the system number and the channel number.

Channel 3 of the PCM transmission system S1, for example, is designated S1K3. For the formation of partial groups, the channels of both PCM transmission systems are to be evenly divided between the two multiplex highways M1 and M2, which lead to different crosspoint groups.

In the example of FIG. 2, the partial groups are formed by the channels S1K1 to S1K3 being interleaved with the channels S2K4 to S2K6 on the multiplex highway M1, while the channels S2K1 to S2K3 are interleaved with the channels S1K4 to S1K6 on the multiplex highway M2.

The switching operations of the changeover switches U1 and U2 of FIG. 1 are controlled by the channel clock rate of the PCM exchange at the beginning of the channel times K1 and K4.

In the following, the savings on links in a PCM exchange consisting of two crosspoint groups each having 36 inputs and 72 wired directions each containing a 30-channel two-way PCM transmission system are calculated by way of example.

Figure 3:
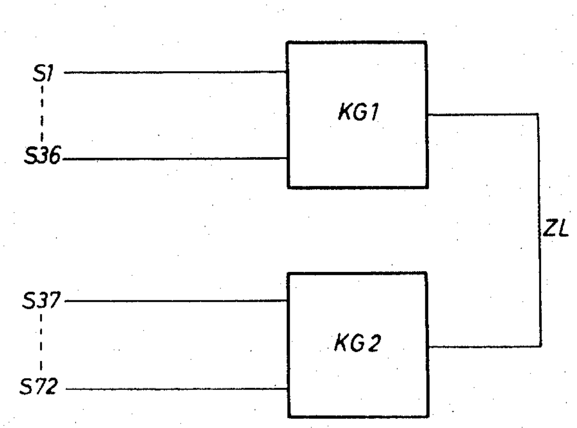
Fig. 3 PRIOR ART
FIG. 3 shows a prior-art system.

FIG. 3 shows the direct wiring of the two crosspoint groups KG1 and KG2, each containing 36 PCM transmission systems S1 to S36 and S37 to S72, respectively. Each PCM transmission system represents a group of 30 lines (channels).

Figure 4:
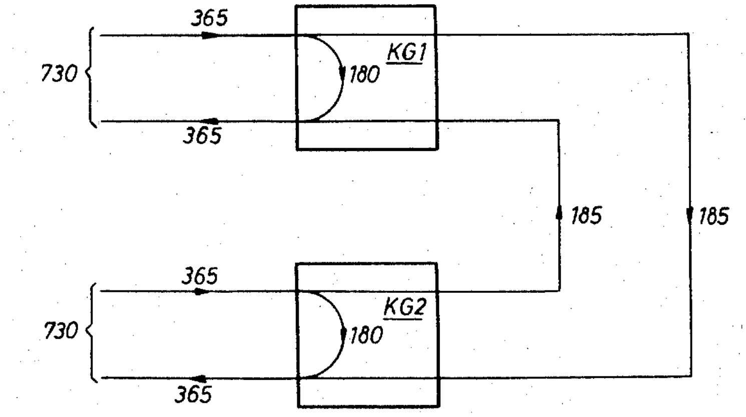
FIG. 4 shows the mean traffic distrubution and the traffic flow in the system of FIG. 3.

FIG. 4 shows the mean traffic distribution and — indicated by arrows the direction and magnitude of the traffic flow outside, within and between the two crosspoint groups. At an availability of $k=n=30$ seizable lines (channels) and a permissible loss of $b = 1\%$, an average traffic of 20.3 erl can flow over each PCM transmission system.

Thus, with 36 wired PCM transmission systems, a total traffic of $36 \times 20.3 = 730$ erl must be switched in a crosspoint group. On an average, this traffic is composed of 365 erl incoming traffic and 365 erl outgoing traffic.

Assuming an even traffic distribution, the incoming traffic of 365 erl is divided at a ratio of 1:1 between two traffic streams, the first of which with about 180 erl must be switched within its own crosspoint group KG1 (or KG2) and the second of which with about 185 erl must be switched via the link $ZL$ to the other crosspoint group KG2.

For example, about 185 erl flow both from the crosspoint group KG1 to the crosspoint group KG2 and from the crosspoint group KG2 to the crosspoint group KG1.

The number of links $ZL$ and crosspoint-group outputs required for this overflow traffic $Y = 370$ erl can be estimated according to the following formula:

$$ZL = Y/(\alpha \cdot n),$$

Where $ZL$ is the number of time-division multiplex links, $Y$ is the overflow traffic between the crosspoint groups, $\alpha$ is the mean occupancy per channel of the links, and n is the number of channels (time slots per pulse frame) per link.

If $\alpha = 0.7$ and $n = 30$, the necessary number of links is $$ZL = 370/(0.7 \cdot 30)\ ZL = 17.6$$

$ZL$ can only be an integer and, therefore, is rounded up to $ZL = 18$. For $\alpha$, this results in a correction of 0.7 to $\alpha = 0.686$.

At this juncture it should be pointed out that the necessary number of links is exactly determined by very complicated calculations relating to traffic theory, and that the calculation carried out here is only designed to permit a quantitative comparison between the prior art and the method according to the invention.

Figure 5:
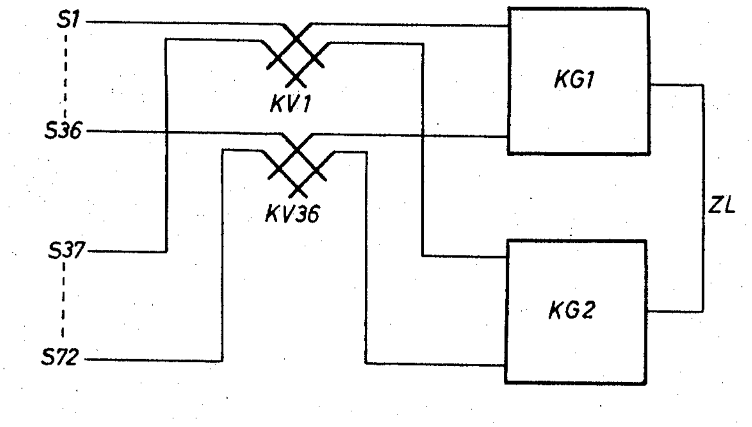
FIG. 5 shows a system according to the invention.

FIG. 5 shows the division of the 72 directions into 2 × 72 partial groups of 15 channels each with the aid of 36 matrices KV1 to KV36, which are operated cyclically by the channel clock rate of the PCM exchange.

In its own crosspoint group, each incoming channel can now reach only 15 channels of the other 71 directions.

Through the links $ZL$, however, this formation of partial groups is cancelled again, and, via this overflow path, each incoming channel is capable of reaching the other 15 channels of the desired direction, too.

Figure 6:
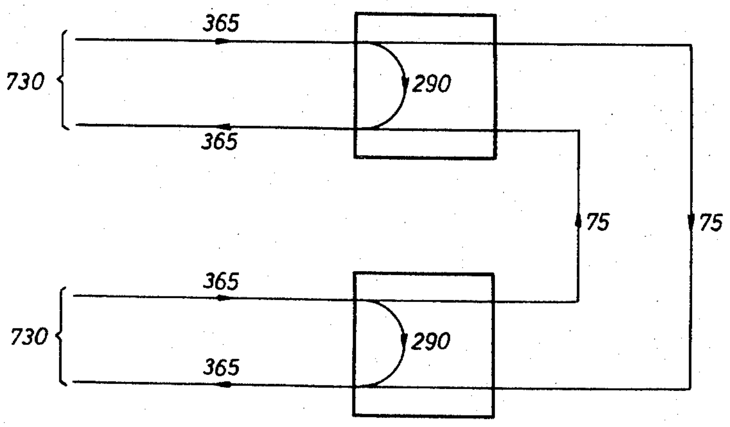
FIG. 6 shows the mean traffic distribution and the traffic flow in the system of FIG. 5.

FIG. 6 shows the traffic distribution for the example of FIG. 5.

As already explained in connection with FIG. 4, a traffic of 20.3 erl can be handled via each group of 30 channels, i.e., each partial group supplies 10.15 erl.

Connected to a crosspoint group are 72 partial groups, via which, in turn, flows a total traffic per crosspoint group of $72 \times 10.15 = 730$ erl.

This traffic is again divided into 365 erl incoming traffic and 365 erl outgoing traffic. A partial group can only be loaded with 8.11 erl sum traffic or 4.055 erl outgoing traffic ($k = n = 15$; $b = 1\%$).

With 72 directions, this results in $72 \times 4.055 = 290$ erl traffic which can be switched in its own crosspoint group. The difference to 365 erl, i.e., 75 erl, must be led from one crosspoint group to the other via the links.

The total overflow traffic between both crosspoint groups is $2 \times 75 = 150$ erl.

If the mean occupancy $\alpha$ of the 30 link channels is again chosen to be $\alpha = 0.7$, then $$ZL = 150/(0.7 \cdot 30)\ ZL = 7.15$$

The number of links can only be integral; therefore, $ZL$ is rounded up to $ZL = 8$. Thereby, $\alpha$ is reduced to 0.6.

A comparison of both grouping techniques shows that, in the example, the number of links in the prior art technique, which is $ZL = 18$, exceeds by about the factor 2.2 the number of links required when the method according to the invention is used.

The investment in circuitry for realizing the additional links which are necessary for a prior-art-type system is considerably higher than that for realizing the crosspoints of the matrices KV of FIG. 5, which crosspoints are operated by the channel clock rate of the exchange and, in practice, only consist of changeover switches crosswise interconnected at the outputs.

What is claimed is:

1. A switching system for time-division multiplex exchanges, comprising a plurality of connection points available for connection to PCM transmission equipment to receive TDM signals into and to transmit TDM signals out of a time-division multiplex exchange, a plurality of crosspoint switching groups forming part of said switching system and providing, in cooperation with said connection points, for the selective interconnection of incoming and outgoing paths for said TDM signals, switching means connected between said connection points and crosspoint switching groups for dividing the TDM signals from each connection point into as many partial groups as there are crosspoint switching groups and for distributing one partial group from each connection point to each crosspoint switching group, said crosspoint groups providing internal paths for routing selected partial groups of TDM signals between incoming and outgoing paths, and a plurality of links coupled to interconnect said crosspoint groups.

2. A system according to claim 1, in which each crosspoint group is wired with the same number of partial groups as there are directions.

3. A system according to claim 1, in which the switching devices for the formation of the partial groups are operated by the channel clock rate.

4. A system according to claim 1, in which several partial groups of different directions are interleaved with respect to time and connected to the input of a crosspoint group.

5. A system according to claim 1, in which the switching devices are built into the matching arrangements for the clock rates.

* * * * *